United States Patent
Kim et al.

(10) Patent No.: US 9,952,734 B2
(45) Date of Patent: Apr. 24, 2018

(54) TOUCH PANEL AND TOUCH DEVICE INCLUDING THE SAME

(71) Applicant: LG INNOTEK CO., LTD., Seoul (KR)

(72) Inventors: Byeong Seob Kim, Seoul (KR); Sung Mok Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/496,111

(22) Filed: Apr. 25, 2017

(65) Prior Publication Data

US 2017/0228067 A1    Aug. 10, 2017

Related U.S. Application Data

(63) Continuation of application No. 14/688,129, filed on Apr. 16, 2015, now Pat. No. 9,665,210.

(30) Foreign Application Priority Data

Apr. 17, 2014    (KR) .................. 10-2014-0046051

(51) Int. Cl.
*G06F 3/044* (2006.01)

(52) U.S. Cl.
CPC .... *G06F 3/044* (2013.01); *G06F 2203/04111* (2013.01); *G06F 2203/04112* (2013.01)

(58) Field of Classification Search
CPC ........ G06F 3/041; G06F 3/0418; G06F 3/044; G06F 2203/04107; G06F 2203/04111; G06F 2203/04112; G06F 2203/04113; G06F 2203/04103
See application file for complete search history.

(56) References Cited

U.S. PATENT DOCUMENTS

| 9,665,210 B2* | 5/2017 | Kim ..................... G06F 3/041 |
| 2010/0182275 A1 | 7/2010 | Saitou |
| 2012/0062481 A1 | 3/2012 | Kim et al. |

(Continued)

FOREIGN PATENT DOCUMENTS

| CN | 102402323 | 4/2012 |
| KR | 10-2012-0133849 | 12/2012 |

(Continued)

OTHER PUBLICATIONS

European Search Report dated Sep. 11, 2015 issued in Application No. 15163763.4.

(Continued)

*Primary Examiner* — Tom Sheng
(74) *Attorney, Agent, or Firm* — KED & Associates, LLP

(57) ABSTRACT

A touch panel includes a substrate, a sensing electrode on the substrate, wires to electrically connect the sensing electrode, a first ground electrode between the sensing electrode and the wire, and an overlap area where the first ground electrode overlaps with the sensing electrode. A touch panel of another embodiment includes a substrate on which an active area and an unactive area are defined, a sensing electrode on the active area, a wire disposed on the unactive area to electrically connect the sensing electrode, and a first ground electrode provided on the active area between the sensing electrode and the wire.

24 Claims, 12 Drawing Sheets

(56) References Cited

U.S. PATENT DOCUMENTS

| | | | |
|---|---|---|---|
| 2012/0306776 A1 | 12/2012 | Kim et al. | |
| 2013/0169585 A1* | 7/2013 | Choon | G06F 3/0416 345/174 |
| 2013/0229364 A1* | 9/2013 | Yu | G06F 3/044 345/173 |
| 2013/0271675 A1* | 10/2013 | Misaki | G06F 3/044 349/12 |
| 2014/0070875 A1 | 3/2014 | Dunphy et al. | |
| 2014/0168138 A1* | 6/2014 | Kuo | G06F 3/0412 345/174 |
| 2015/0009422 A1* | 1/2015 | Tung | G06F 3/044 349/12 |
| 2015/0070312 A1* | 3/2015 | Her | G06F 3/041 345/174 |
| 2015/0114816 A1* | 4/2015 | Kim | G06F 3/044 200/600 |
| 2015/0130760 A1* | 5/2015 | Kim | G06F 3/044 345/174 |
| 2015/0145814 A1* | 5/2015 | Burger | H03K 17/955 345/174 |
| 2015/0169109 A1* | 6/2015 | Park | G06F 3/044 345/174 |
| 2015/0293634 A1* | 10/2015 | Her | G06F 3/044 345/174 |

FOREIGN PATENT DOCUMENTS

| | | |
|---|---|---|
| KR | 10-2013-0074933 | 7/2013 |
| TW | 201234247 | 8/2012 |

OTHER PUBLICATIONS

Taiwanese Office Action dated Jul. 18, 2016 issued in Application No. 104111399 (with English translation).

U.S. Office Action dated Aug. 30, 2016 issued in parent U.S. Appl. No. 14/688,129.

U.S. Notice of Allowance dated Jan. 30, 2017 issued in parent U.S. Appl. No. 14/688,129.

* cited by examiner

TOUCH PANEL AND TOUCH DEVICE INCLUDING THE SAME

CROSS-REFERENCE TO RELATED APPLICATION

This application is a Continuation Application of prior U.S. patent application Ser. No. 14/688,129 filed Apr. 16, 2015, which claims priority under 35 U.S.C. § 119 to Korean Patent Application No. 10-2014-0046051 filed on Apr. 17, 2014, whose entire disclosure is hereby incorporated by reference.

BACKGROUND

1. Field

The embodiment relates to a touch panel and a touch device including the same.

2. Background

A touch panel is installed on a display surface of an image display device such as a cathode ray tube (CRT), a liquid crystal display (LCD), a field emission display (FED), a plasma display panel (PDP), and an electro-luminescence device (ELD), so that a user inputs predetermined information into an electronic appliance by pressing the touch panel while viewing the image display device. In such a touch panel, electric signal interference may occur due to static electricity or ESD, so that the accuracy of touch is deteriorated.

BRIEF DESCRIPTION OF THE DRAWINGS

The embodiments will be described in detail with reference to the following drawings in which like reference numerals refer to like elements wherein.

DETAILED DESCRIPTION

Figure 1:
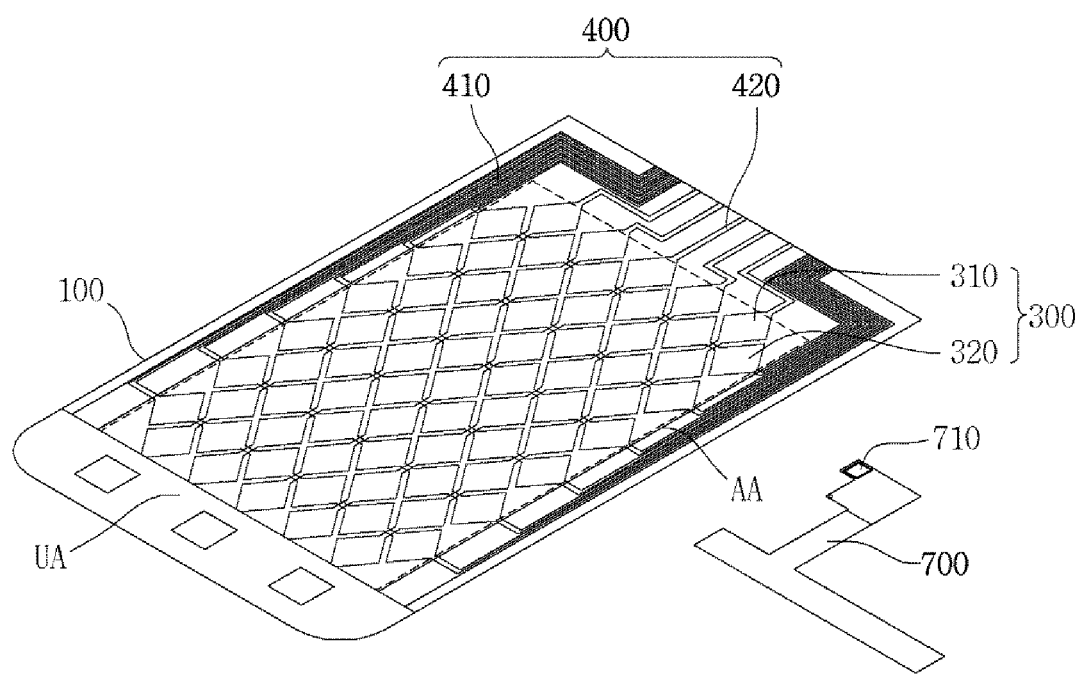
FIG. 1 is an exploded perspective view of a touch panel according to the embodiment.
Figure 2:
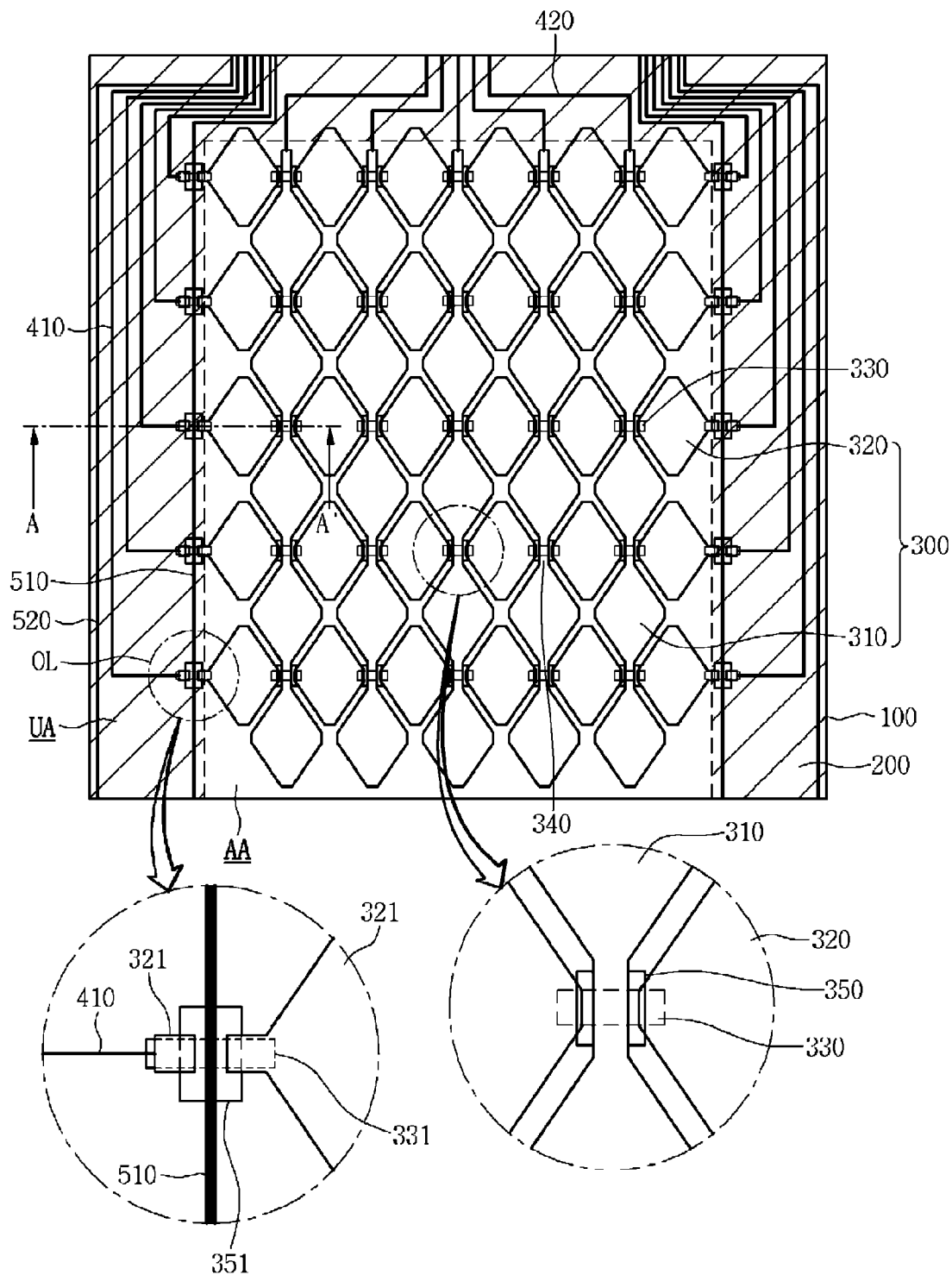
FIG. 2 is a plan view of a touch panel according to the embodiment.
Figure 3:
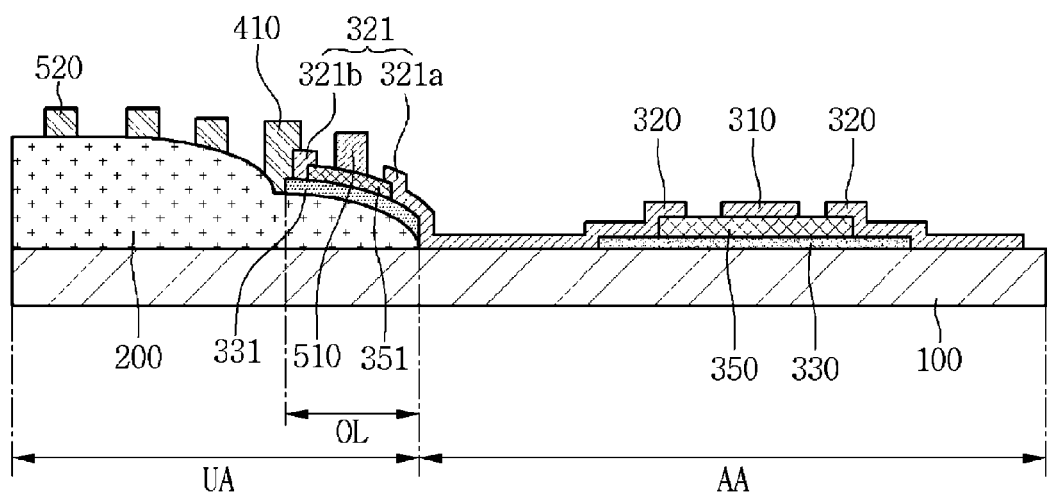
FIG. 3 is a sectional view taken along line A-A' of FIGS. 1 and 2.

Referring to FIGS. 1 to 3, a touch panel according to the embodiment may include a sensing electrode 300, a wire electrode 400, and a first ground electrode 510 provided over a substrate and may further include a printed circuit board 700.

The substrate 100 may include an active area A where light passes through and an unactive area UA around the active area A where light does not pass through. The active area AA signifies an area through which a touch instruction of a user may be input and the unactive area UA, which is contrary to the active area AA, is not activated even if a user touches the unactive area UA, so the unactive area UA signifies an area through which any touch instructions cannot be input.

The substrate 100 may be flexible or rigid. For example, the substrate 100 may include glass or plastic. In detail, the substrate 100 may include chemically tempered glass, such as soda lime glass or aluminosilicate glass, plastic, such as polyimide (PI), polycarbonate (PC), COP film or COC film, or sapphire.

A sapphire substrate has superior electric characteristics, such as permittivity, so that a touch response speed may be remarkably increased and a space touch, such as hovering, may be easily implemented. The sapphire substrate has high surface hardness, so the sapphire may be used for a cover substrate. The hovering signifies a technique of recognizing coordinates even at a short distance from a display.

The substrate 100 may be bendable to have a partial curved surface. In other words, the substrate 100 is bendable such that a portion of the substrate has a flat surface and another portion of the substrate has a curved surface. An end portion of the substrate 100 may be bent with a curved surface or may be curved or bent with a surface having a random curvature.

The substrate 100 may be a cover substrate. An additional cover substrate may be disposed on the substrate 100.

A printing layer 200, the sensing electrode 300 and the wire 400 may be disposed on one surface of the substrate 100. The printing layer 200 may be formed on the unactive area UA. The printing layer 200 may extend along an edge of the substrate 100. The printing layer 200 may be formed through one-color printing, two-color printing or three-color printing. The printing layer 200 may be formed by coating black ink or white ink according to the desired outer appearance thereof. The printing layer 200 may prevent the wire 400, which will be described later, from being viewed from the outside. In addition, a pattern may be formed on the printing layer 200 to realize a desired logo.

The sensing electrode 300 and the wire 400 may be disposed on the substrate 100. The sensing electrode 300 may include a driving electrode to transmit a signal and a receiving electrode to receive a signal. For the purpose of convenience, the driving electrode and the receiving electrode together will be called the sensing electrode for sensing a touch position. The sensing electrode 300 may be disposed on the active area AA and the wire 400 may be disposed on the unactive area UA.

The sensing electrode 300 may include a conductive material or a transparent conductive material. For example, the sensing electrode 300 may include metal oxide such as indium tin oxide (ITO), indium zinc oxide (IZO), copper oxide, tin oxide, zinc oxide, or titanium oxide. The sensing electrode 300 may be also a nanowire, a photosensitive nanowire film, carbon nanotube (CNT), graphene, or conductive polymer. The sensing electrode 300 may be also comprised of various metals. For instance, the sensing electrode 300 may include at least one of Cr, Ni, Cu, Al, Ag, Mo, Au, Ti and an alloy thereof.

The sensing electrode 300 may be aligned in the form of a mesh. For example, the sensing electrode 300 may include a plurality of sub-electrodes which cross each other in the form of a mesh. The sensing electrode 300 may include mesh lines and mesh openings between the mesh lines due to the sub-electrodes which cross each other in the mesh shape. The mesh line may have a line width in the range of about 0.1 μm to about 10 μm. If the mesh line has a line width less than 0.1 μm it may not be possible to form the mesh line through the manufacturing process. If the mesh line has a line width above 10 μm, the electrode pattern may be viewed from the outside so the visibility may be deteriorated. The line width of the mesh line may be in the range of about 1 μm to about 5 μm. The line width of the mesh line may be also in the range of about 1.5 μm to about 3 μm.

The mesh opening may have various shapes. For instance, the mesh opening may have various shapes such as a polygonal shape including a rectangular shape, a diamond shape, a pentagonal shape or a hexagonal shape, or a circular shape. In addition, the mesh opening may have a regular shape or a random shape.

Since the sensing electrode 200 has the mesh shape, it is possible to hide the pattern of the sensing electrode 200 on the active area AA, e.g., the display area. Even if the sensing electrode 200 is formed of metal, the pattern may not be viewed. In addition, even if the sensing electrode 200 is applied to a large-size touch panel, the resistance of the touch panel may be lowered.

The touch panel according to the embodiment may have various structures depending on the position of a first sensing electrode 310 and a second sensing electrode 320. For example, the first sensing electrode 310 and the second sensing electrode 320 may be disposed on the same surface of the substrate 100. The first sensing electrode 310 may be disposed on one surface of the substrate 100 and the second sensing electrode 320 may be disposed on the other surface of the substrate 100.

Further, the first sensing electrode 310 may be disposed on one surface of a substrate formed on the substrate 100 and the second sensing electrode 320 may be disposed on the other surface of the substrate formed on the substrate 100. Although FIG. 1 shows the first sensing electrode 310 and the second sensing electrode 320 disposed on the same surface of the substrate 100, the embodiment is not limited thereto.

The sensing electrode 300 may include the first sensing electrode 310, the second sensing electrode 320 and a bridge electrode 330. The first sensing electrode 310, the second sensing electrode 320 and the bridge electrode 330 may include the same material or mutually different materials. The first sensing electrode 310, the second sensing electrode 320 and the bridge electrode 330 may be disposed on the same surface of the substrate 100.

The first sensing electrode 310 and the second sensing electrode 320 may be insulated from each other on the substrate 100. The first sensing electrodes 310 may extend in one direction while being connected with each other and the second sensing electrodes 320 may include a plurality of unit electrodes spaced apart from each other.

For example, the first bridge electrode 330 may be disposed on one surface of the substrate 100, a first insulating layer 350 may be partially disposed on the first bridge electrode 330 and the first sensing electrode 310 and the second sensing electrode 320 may be disposed on the first insulating layer 350. On the first insulating layer 350, the first sensing electrodes 310 may be connected with each other and the second sensing electrodes 320 may be spaced apart from each other.

The first insulating layer 350 may be disposed on connection parts of the first sensing electrodes 310 and on a portion of the second sensing electrodes 320 and the bridge electrode 330 may be disposed on the first insulating layer 350 to connect the second sensing electrodes 320, so that the second sensing electrodes 320, which are spaced apart from each other, may be electrically connected with each other. The second sensing electrodes 320 may extend in a direction different from an extension direction of the first sensing electrodes 310 by the first bridge electrode 330.

The first sensing electrode 310 and the second sensing electrode 320 may be insulated from each other on the same surface of the substrate 100 without making contact with each other. The first bridge electrode 330, for example, may be aligned in the form of a bar. The first bridge electrode 330 may be aligned in the form of bars spaced apart from each other on the active area AA. The first bridge electrode 330 may connect the second sensing electrodes 320 which will be described later.

The first insulating layer 350 may be disposed on the first bridge electrode 330. In detail, the first insulating layer 350 may be partially disposed on the first bridge electrode 330. For example, when the first bridge electrode 330 is aligned in the form of a bar, the first insulating layer 350 may be disposed on the first bridge electrode 330 except for one end and the other end of the first bridge electrode 330, that is, both ends of the first bridge electrode 330.

The first sensing electrode 310 and the second sensing electrode 320 may be disposed on the active area AA to serve as sensors for sensing the touch. The first sensing electrode 310 may extend in one direction on the active area AA and the second sensing electrode 320 may extend in a direction different from an extension direction of the first sensing electrode 310. One of the first sensing electrode 310 and the second sensing electrode 320 may transmit a signal and the other may receive a touch signal. One of the first sensing electrode 310 and the second sensing electrode 320 may be disposed on the first insulating layer 350 and the other may be connected to both ends of the bridge electrode 330.

For example, as shown in FIG. 2, the first sensing electrodes 310 may be disposed on the first insulating layer 350 and the second sensing electrodes 320 may be connected to both ends of the bridge electrode 330 so that the second sensing electrodes 320 may be electrically connected with each other. Due to the bridge electrode 330 and the insulating material, the first sensing electrode 310 and the second sensing electrode 320 may be electrically connected with each other without being short-circuited.

A first wire 410 connected to the second sensing electrode 320 may be disposed on the unactive area UA of the substrate 100. In addition, a second wire 420 connected to the first sensing electrode 310 may be disposed on the unactive area UA of the substrate 100. The first wire 410 and the second wire 420 may include conductive material. The first wire 410 and the second wire 420 may include metallic material, such as Ag or Cu.

The first wire 410 and the second wire 420 may be electrically connected to the printed circuit board 700, respectively. The first wire 410 and the second wire 420 may transfer the touch signal sensed by the first sensing electrode 310 and the second sensing electrode 320 to the printed circuit board 700 on which a drive chip 710 is mounted, so that the touch operation may be performed. For example, the printed circuit board 700 may be a flexible printed circuit board (FPCB).

The first ground electrode 510 may be disposed adjacent to the wire 400. The first ground electrode 510 may be disposed between the sensing electrode 300 and the wire 400. The first ground electrode 510 may be disposed on an area where the sensing electrode 300 is connected to the wire 400. The first ground electrode 510 may prevent static electricity or ESD in the touch panel. The static electricity or ESD may move along a path of the first ground electrode 510 so that the static electricity or ESD can be prevented from being introduced into the touch panel.

One end of the first ground electrode 510 may be electrically connected to the printed circuit board 700. The first ground electrode 510 may be withdrawn to a top end or a bottom end of the substrate 100. The first ground electrode 510 may be electrically connected to the printed circuit board 700 so that the ESD in the touch panel may be discharged as an electric signal. Thus, signal interference can be prevented so that accuracy and reliability of a touch can be improved.

An overlap part OL may be formed between the first ground electrode 510 and the sensing electrode 300. The overlap part OL may be formed in the unactive area UA, but the embodiment is not limited thereto. According to the embodiment, the overlap part OL may be disposed on the printing layer 200. The overlap part OL disposed on the unactive area UA may be located closer to the active area AA. The overlap part OL may be disposed at an inner portion of the unactive area UA.

The overlap part OL may include a third sensing electrode 321 extending from the second sensing electrode 320, a second bridge electrode 331, a second insulating layer 351 and the first ground electrode 510. The third sensing electrode 321 may not be an additional sensing electrode, but may be an extension part extending from the second sensing electrode 320. The third sensing electrode 321 may include a first sub-third sensing electrode 321a extending from the second sensing electrode 320 and a second sub-third sensing electrode 321b connected to the wire 400. The first sub-third sensing electrode 321a may be electrically connected to the second sub-third sensing electrode 321b, but the embodiment is not limited thereto.

Meanwhile, the unactive area UA may include a left bezel located to a left of the active area AA and a right bezel located to a right of the active area AA. The first ground electrodes 510 may be disposed on the left and right bezels, respectively. An additional first ground electrode 510 may be provided to connect one end of the first ground electrode 510 disposed on the left bezel to one end of the first ground electrode 510 disposed on the right bezel. In other words, when viewed in a top view, the first ground electrode 510 may surround the left, right and bottom (or top) of the active area AA, but the embodiment is not limited thereto.

The first wires 410 may be disposed in the left and right bezels. The first ground electrode 510 may be disposed on the first wires 410, which are provided in the left bezel or the right bezel, and all connection parts of the sensing electrodes 300. In addition, the first ground electrode 510 may include parts which are parallel to the first wires 410 provided in the left bezel or the right bezel.

The second bridge electrode 331, the second insulating layer 351 and the first ground electrode 510 may be sequentially laminated in the overlap part OL. The third sensing electrode 321 may be electrically connected to the second bridge electrode 331. The third sensing electrode 321 may come into contact with the second bridge electrode 331. The first sub-third sensing electrode 321a may be disposed on a top surface of one side of the second bridge electrode 331 and the second sub-third sensing electrode 321b may be disposed on a top surface of the other side of the second bridge electrode 331. The first sub-third sensing electrode 321a may be electrically connected to the second sub-third sensing electrode 321b through the second bridge electrode 331.

A plurality of overlap parts OL may be disposed on each bezel. The first ground electrode 510 may be disposed on at least one overlap part OL. The first ground electrode 510 may be disposed on all overlap parts OL formed on the left bezel or the right bezel.

The second bridge electrode 331 may be disposed on the printing layer 200. The second bridge electrode 331 may include a material the same as or similar to a material of the first bridge electrode 330. The second bridge electrode 331 may be formed simultaneously with the first bridge electrode 330 through the same process.

The second insulating layer 351 may be disposed on the second bridge electrode 331. The second insulating layer 351 may be disposed on the top surface of the second bridge electrode 331 between the first sub-third sensing electrode 321a and the second sub-third sensing electrode 321b formed on the second bridge electrode 331. At least a part of the first sub-third sensing electrode 321a may be disposed on the second insulating layer 351. In addition, at least a part of the second sub-third sensing electrode 321b may be disposed on the second insulating layer 351.

The second insulating layer 351 may include a material the same as or similar to a material of the first insulating layer 350. The second insulating layer 351 may be formed simultaneously with the first insulating layer 350 through the same process.

The first sub-third sensing electrode 321a may extend from the second sensing electrode 320 to the unactive area UA. The third sensing electrode 321 may include a material the same as or similar to a material of the second sensing electrode 320. The third sensing electrode 321 may be formed simultaneously with the second sensing electrode 320 through the same process. The first wire 410 may be connected to one end of the second sub-third sensing electrode 321b. Thus, an electric signal may be applied to the second sensing electrode 320 formed in the active area AA.

The first ground electrode 510 may be disposed on the second insulating layer 351. The first ground electrode 510 may include a material the same as or similar to a material of the wire 400. The electric short between the first ground electrode 510 and the second bridge electrode 331 may be prevented. In the overlap part OL, the first ground electrode 510 may overlap with the second bridge electrode 331 without the electric short. The first ground electrode 510 may extend along the sensing electrode 300. The first ground electrode 510 may extend along one side of the substrate 100. The length of the first ground electrode 510 may be at least equal to or longer than the length of the wire. Accordingly, the first ground electrode 510 may effectively prevent the coupling between the sensing electrode and the wire in each channel and may improve accuracy of touch.

In addition, the uniform touch sensitivity may be achieved regardless of the touch positions. The non-uniform sensing, which signifies that the touch to an outer portion of the substrate 100 is sensitively detected and the touch to the center portion of the substrate 100 is insensitively detected, may be prevented. Accordingly, the hovering function may be accurately recognized and accuracy of the proximal touch and the glove touch may be improved.

A second ground electrode 520 may be further disposed at an outermost portion of the substrate 100. Since the second ground electrode 520 is disposed along an edge of the substrate 100, the static electricity or ESD can be prevented from being introduced into the touch panel. The second ground electrode 520 may be disposed along an entire edge of the substrate 100.

Figure 4:
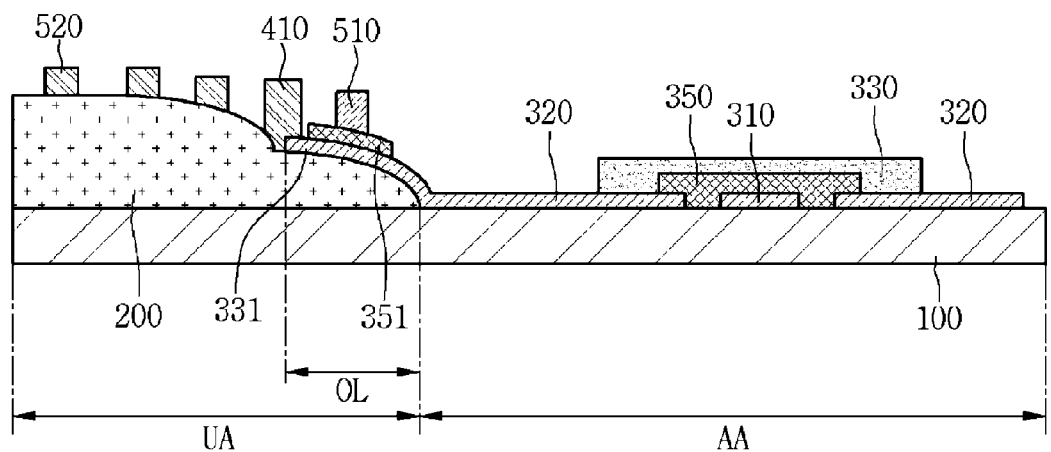
FIGS. 4 to 7 are sectional views of a touch panel according to another embodiment.

Although it has been described that the first bridge electrode 330, the first insulating layer 350 and the sensing electrodes 310 and 320 are sequentially laminated, the embodiment is not limited thereto. As shown in FIG. 4, the sensing electrodes 310 and 320, the first insulating layer 350 and the first bridge electrode 330 may be sequentially laminated. That is, the third sensing electrode 321 may be integrally formed without being divided into first and second-sub sensing electrodes. In this case, the third sensing electrode 321 extending from the second sensing electrode 320 may be disposed under the first ground electrode 510.

The overlap part OL may include the third sensing electrode 321 extending from the second sensing electrode 320 and the second insulating layer 351 disposed on the third sensing electrode 321. Different from the embodiment shown in FIG. 3, the bridge electrode may not be disposed in the overlap part OL. In this case, the first ground electrode 510 may be disposed on the second insulating layer 351.

Figure 5:
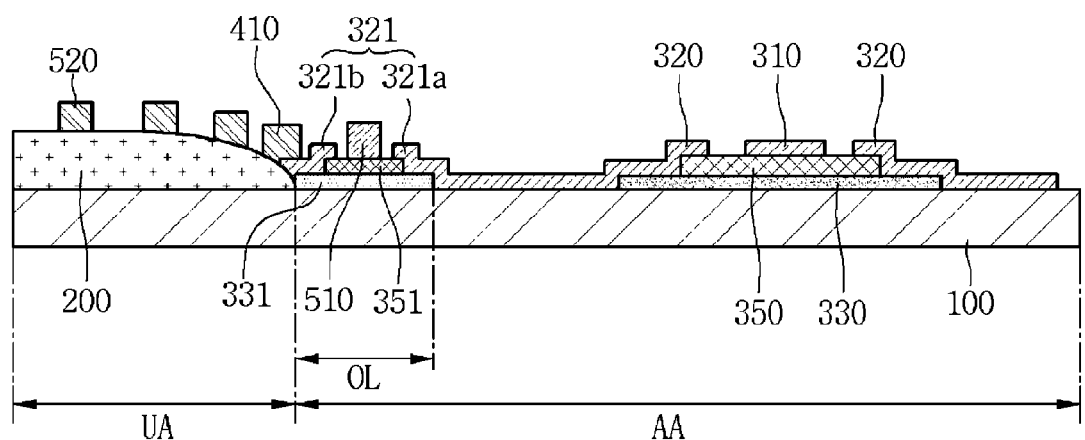

Referring to FIG. 5, the first ground electrode 510 may be disposed on the active area AA. The first ground electrode 510 may overlap with the sensing electrode 300 in the overlap part OL and the overlap part OL may be disposed on the active area AA. The first ground electrode 510 may include a material the same as or similar to a material of the sensing electrode 300. The first ground electrode 510 may be prevented from being viewed in the active area AA.

Since the first ground electrode 510 is disposed on the active area AA, a larger active area AA may be obtained. Since the first ground electrode 510 is not viewed from the outside, the printing layer to cover the first ground electrode 510 may not be required, so that the larger active area AA may be obtained. Thus, limitation of design caused by the bezel may be solved.

The second ground electrode 520 may be further disposed on the unactive area UA at the outermost portion of the substrate 100. The second ground electrode 520 may be disposed on the printing layer 200 such that the second ground electrode 520 may not be viewed from the outside. The first ground electrode 510 and the second ground electrode 520 may include the same material. That is, the first ground electrode 510 may include a material, which is not viewed from the outside, and the second ground electrode 520 may include a material the same as or similar to a material of the wire 400.

Figure 6:
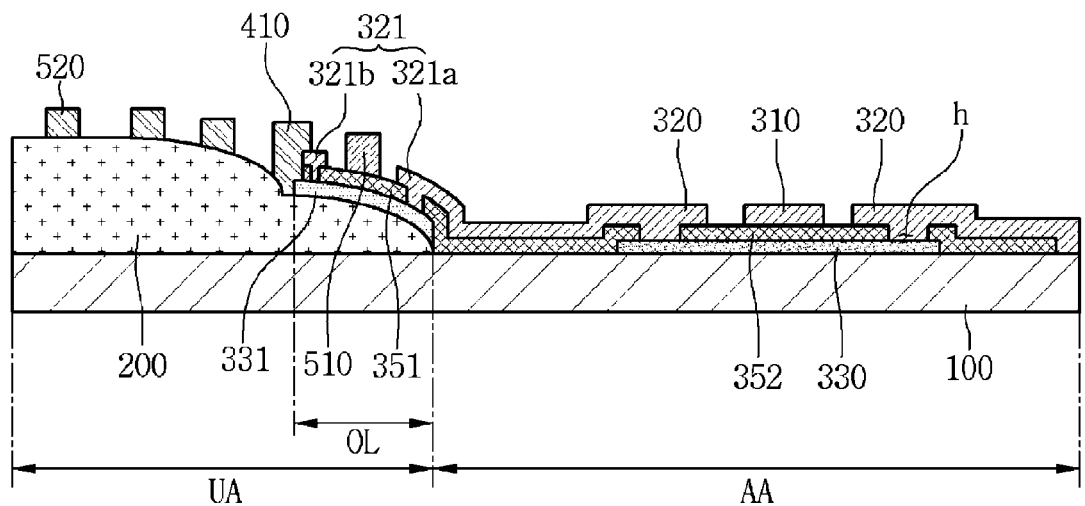

Referring to FIG. 6, the insulating layer 352 may be disposed on the entire surface of the active area AA and the overlap part OL in the structure of FIG. 3. In other words, the first insulating layer 350 and the second insulating layer 351 may be connected with each other, so that the first insulating layer 350 and the second insulating layer 351 may be replaced with the insulating layer 352. In this case, the insulating layer 352 may include a hole h. The first bridge electrode 330 may be electrically connected to the second sensing electrode 320 through the hole h.

Figure 7:
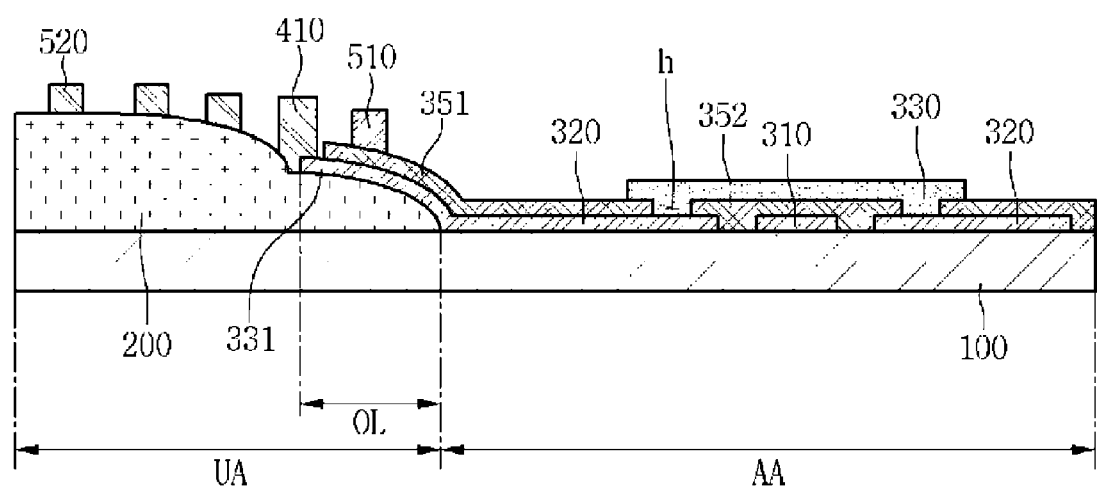

Referring to FIG. 7, the insulating layer 352 may be disposed on the entire surface of the active area AA and the overlap part OL in the structure of FIG. 4. In other words, the first insulating layer 350 (see FIG. 3) and the second insulating layer 351 (see FIG. 3) may be connected with each other, so that the first insulating layer 350 and the second insulating layer 351 may be replaced with the third insulating layer 352. In this case, the third insulating layer 352 may include a plurality of holes h. The first bridge electrode 330 may be electrically connected to the second sensing electrode 320 through the holes h. In addition, the first bridge electrode 330 may be electrically connected to the third sensing electrode 321 through the holes h. Thus, the second sensing electrode 320 may be electrically connected to the third sensing electrode 321 through the first bridge electrode 330.

Meanwhile, the first sub-third sensing electrode 321*a* and the second sub-third sensing electrode 321*b* may be disposed on the third insulating layer 352 and the second bridge electrode 331 may be disposed under the third insulating layer 352. The first sub-third sensing electrode 321*a* may be electrically connected to the second bridge electrode 331 through the hole of the third insulating layer 352. In addition, the second sub-third sensing electrode 321*b* may be electrically connected to the second bridge electrode 331 through the hole of the third insulating layer 352. Thus, the first sub-third sensing electrode 321*a* may be electrically connected to the second sub-third sensing electrode 321*b* through the second bridge electrode 331.

Figure 8:
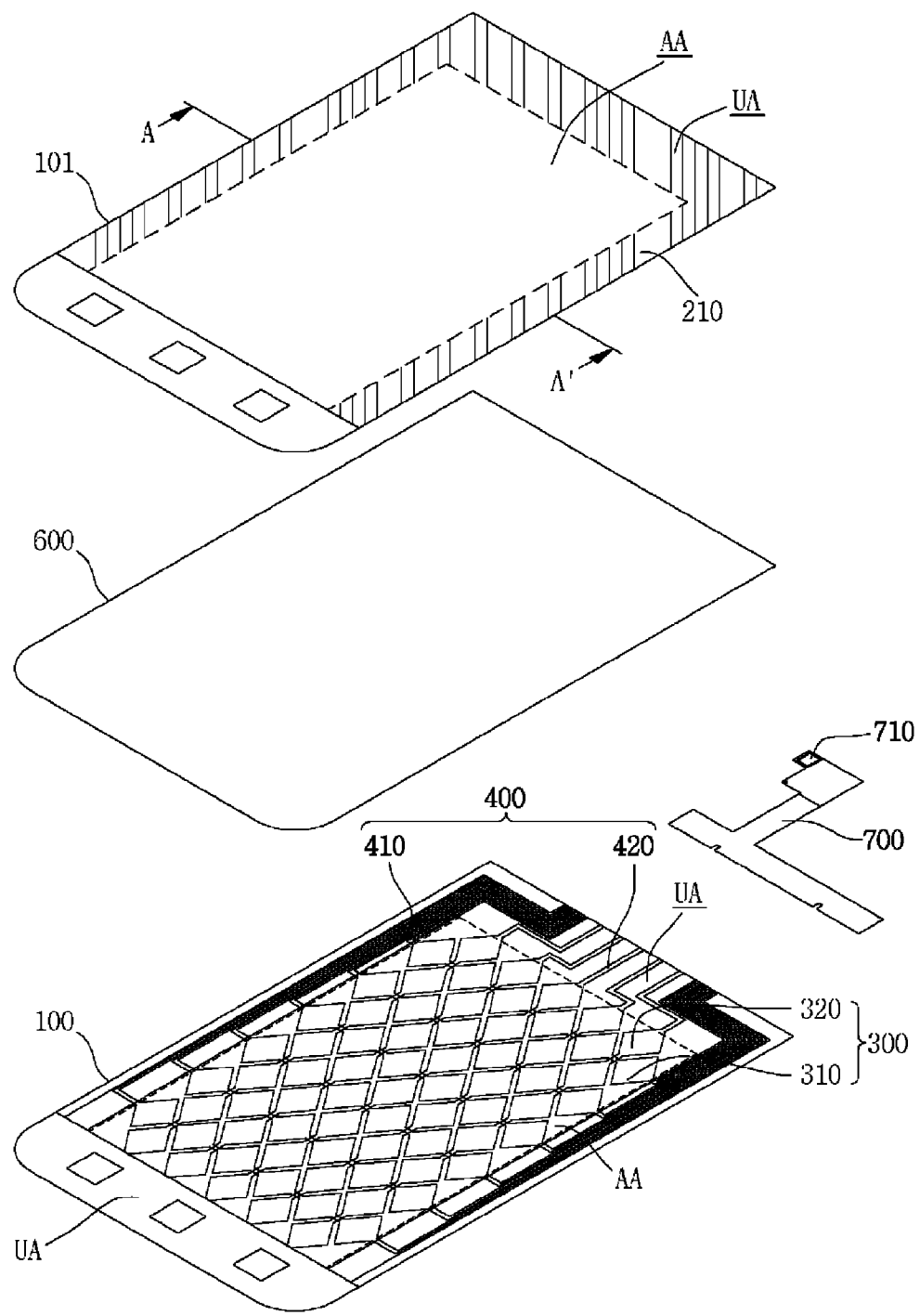
FIGS. 8 to 10 are views to explain various types of touch panels according to the embodiment.

Referring to FIG. 8, a cover substrate 101 may be further provided on the substrate 100. The cover substrate 101 may be combined with the substrate 100 by a transparent adhesive 600, such as optical clear adhesive (OCA). The touch panel according to the embodiment may include the cover substrate 101 and the substrate 100 formed on the cover substrate 101.

In addition, the first sensing electrode 310 may be disposed on the cover substrate 101 and the second sensing electrode 320 may be disposed on the substrate 100. The first sensing electrode 310 extending in one direction and the wire 400 connected to the first sensing electrode 310 may be disposed on one surface of the cover substrate 101. In this case, the first ground electrode may be disposed on the overlap part where the first sensing electrode 310 is connected to the wire 400.

The second sensing electrode 320 extending in the direction different from the extension direction of the first sensing electrode 310 and the wire 400 connected to the second sensing electrode 320 may be disposed on one surface of the substrate 100. In this case, the first ground electrode may be disposed on the overlap part where the second sensing electrode 320 is connected to the wire 400.

Figure 9:
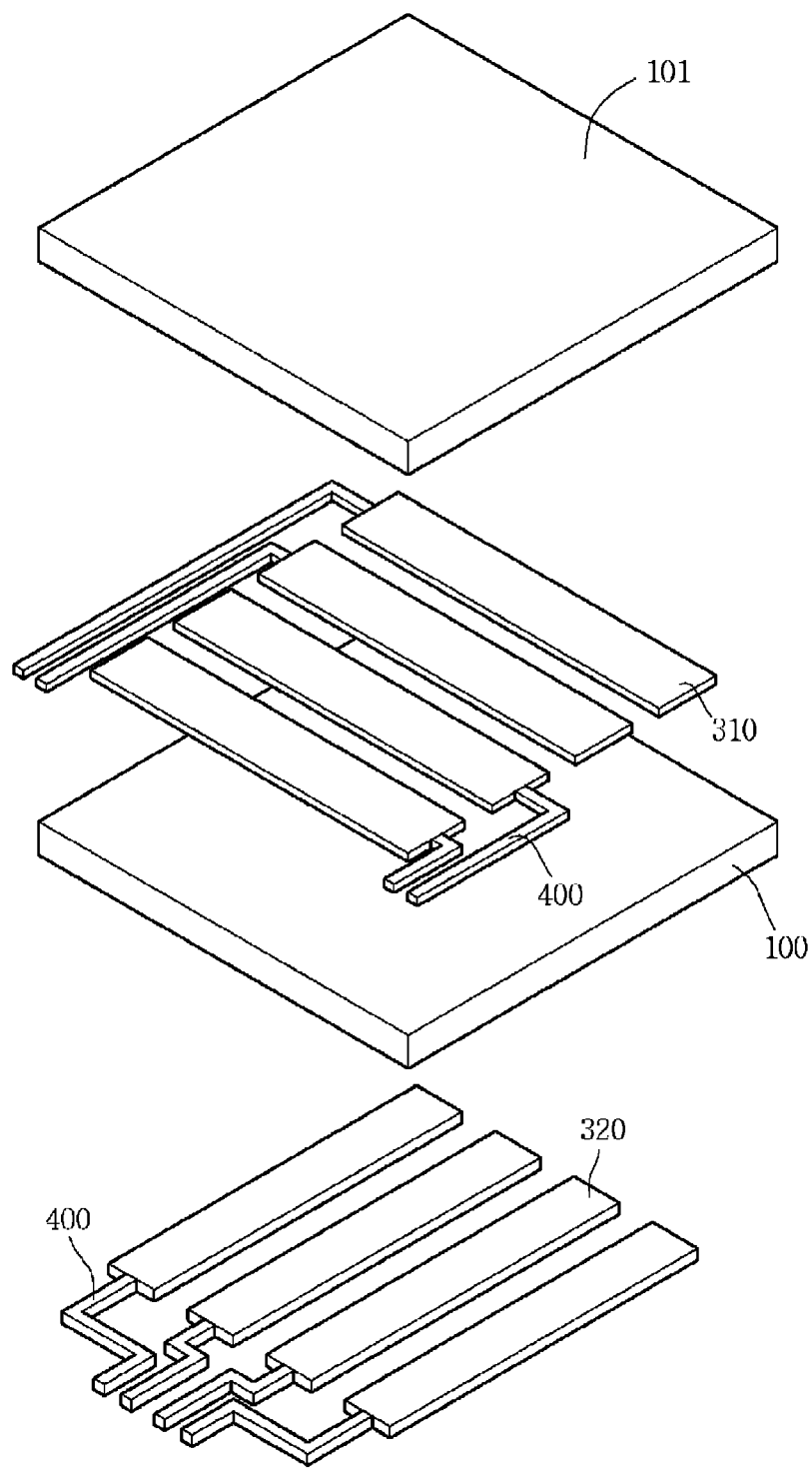

Referring to FIG. 9, the touch panel according to the embodiment may include the cover substrate 101 and the substrate 100 formed on the cover substrate 101. The first sensing electrode 310 and the second sensing electrode 320 may be disposed on the substrate 100.

The first sensing electrode 310 extending in one direction and the wire 400 connected to the first sensing electrode 310 may be disposed on one surface of the substrate 101. The first ground electrode may be disposed on the overlap part where the first sensing electrode 310 is connected to the wire 400.

The second sensing electrode 320 extending in the direction different from the extension direction of the first sensing electrode 310 and the wire 400 connected to the second sensing electrode 320 may be disposed on the other surface of the substrate 100. In this case, the first ground electrode may be disposed on the overlap part where the second sensing electrode 320 is connected to the wire 400.

Figure 10:
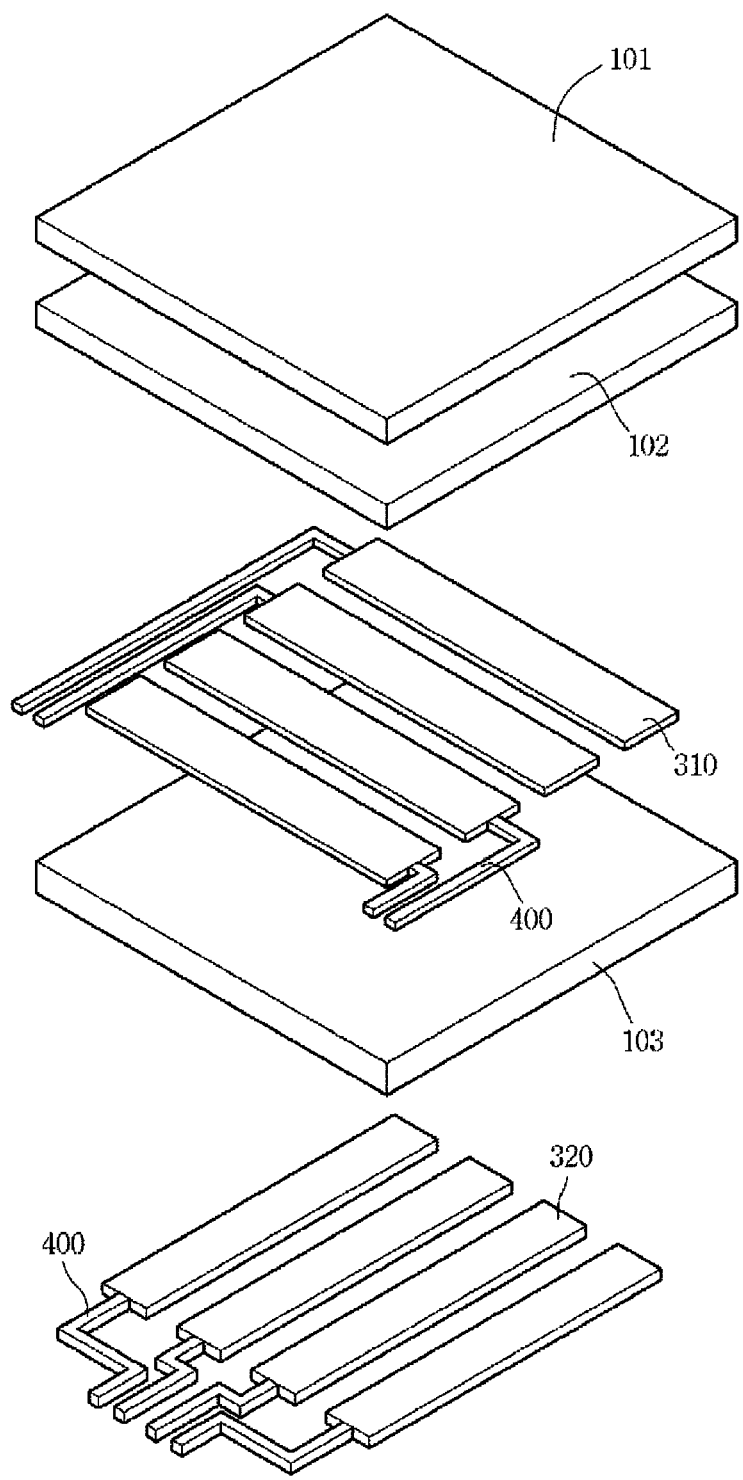

Referring to FIG. 10, the touch panel according to the embodiment may include the cover substrate 101, a first substrate 102 formed on the cover substrate 101 and a second substrate 103 formed on the first substrate 102. The first ground electrode may be disposed on the overlap part where the first sensing electrode 310 is connected to the wire 400.

In addition, the first sensing electrode 310 may be disposed on the first substrate 102 and the second sensing electrode 320 may be disposed on the second substrate 103. The first sensing electrode 310 extending in one direction and the wire 400 connected to the first sensing electrode 310 may be disposed on one surface of the first substrate 102.

The second sensing electrode 320 extending in the direction different from the extension direction of the first sensing electrode 310 and the wire 400 connected to the second sensing electrode 320 may be disposed on one surface of the second substrate 103. In this case, the first ground electrode may be disposed on the overlap part where the second sensing electrode 320 is connected to the wire 400.

A touch device including the touch panel coupled with a display panel will be described with reference to FIGS. 11 to 13.

Figure 11:
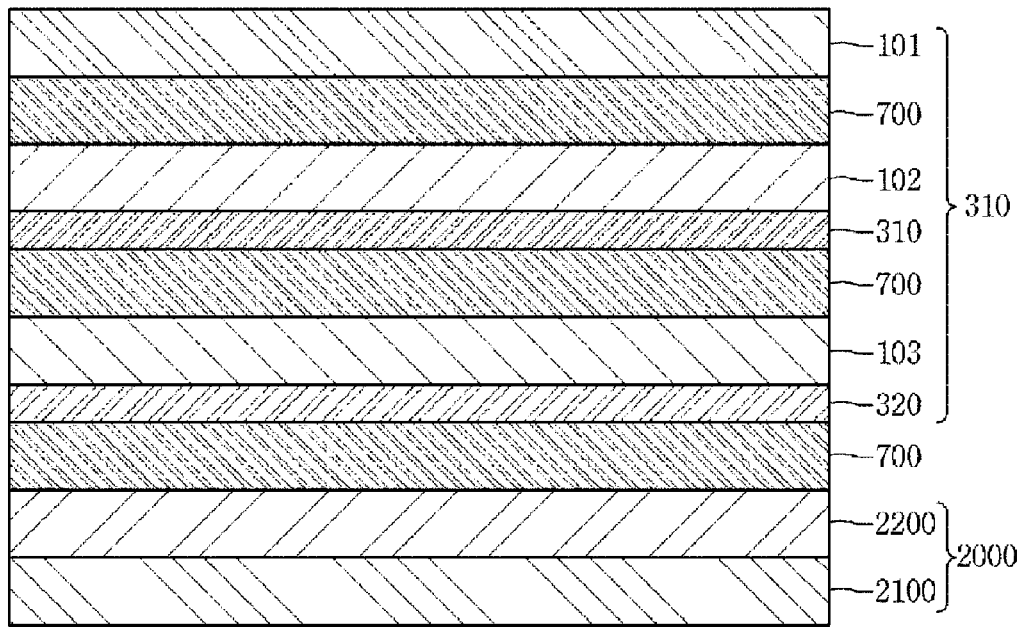
FIGS. 11 to 13 are views showing a touch device including a touch panel coupled with a display panel according to the embodiment.

Referring to FIG. 11, the touch device according to the embodiment may include the display panel 2000 and the touch panel 1000 disposed on the display panel 2000. For example, the display panel 2000 may be combined with the touch panel 1000 by an adhesive layer 700 including optical clear adhesive (OCA).

Although FIG. 11 shows the touch panel 1000 including the cover substrate 101, the first substrate 102 and the second substrate 103, in which the cover substrate 101, the first substrate 102 and the second substrate 103 are combined with each other by the adhesive layer 700, the first sensing electrode 310 is disposed on the first substrate 102 and the second sensing electrode 320 is disposed on the second substrate, and the display panel 2000 combined with the touch panel 1000 by the adhesive layer 700, the embodiment is not limited thereto. The touch panel according to various embodiments may be combined with the display panel 2000.

When the display panel 2000 is a liquid crystal display panel, the display panel 2000 may be formed in a structure in which a 1st' substrate 2100 including a thin film transistor (TFT) and a pixel electrode is combined with a 2nd' substrate 2200 including color filter layers while a liquid crystal layer is interposed between the 1st' and 2nd' substrates 2100 and 2200.

In addition, the display panel 2000 may be a liquid crystal display panel having a COT (color filter on transistor) structure in which a thin film transistor, a color filter, and a black matrix are formed on the 1st' substrate 2100, and the 1st' substrate 2100 is combined with the 2nd' substrate 2200 while a liquid crystal layer is interposed between the 1st' and 2nd' substrates 2100 and 2200. In other words, the thin film transistor may be formed on the 1st' substrate 2100, a protective layer may be formed on the thin film transistor, and the color filter layer may be formed on the protective layer. In addition, a pixel electrode making contact with the thin film transistor is formed on the 1st' substrate 2100. In this case, in order to improve the aperture rate and simplify the mask process, the black matrix may be omitted, and the common electrode may serve as the black matrix.

In addition, when the display panel 2000 is a liquid crystal panel, the display device may further include a backlight unit for providing light from the rear surface of the display panel 2000.

When the display panel 2000 is an organic electroluminescent display panel, the display panel 2000 may include a self-light emitting device which does not require any additional light source. The display panel 2000 includes a thin film transistor formed on the 1st' substrate 2100 and an organic light emitting device (OLED) making contact with the thin film transistor. The OLED may include an anode, a cathode and an organic light emitting layer formed between the anode and the cathode. In addition, the 2nd' substrate 2200 may be further formed on the organic light emitting device to perform the function of an encapsulation substrate for encapsulation.

Figure 12:
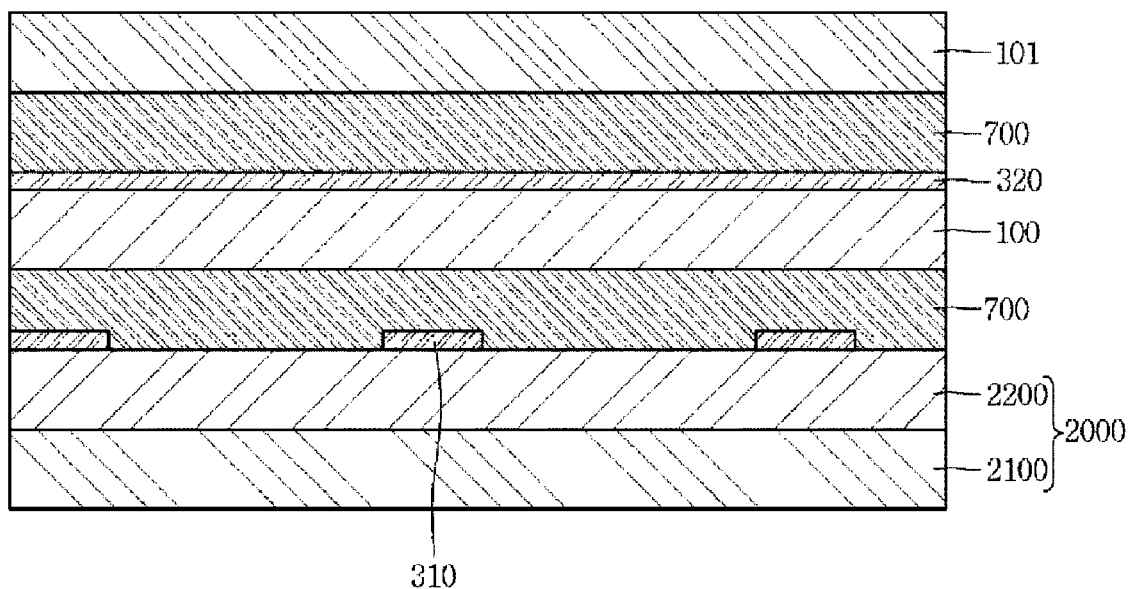

Referring to FIG. 12, the touch device according to another embodiment may include a touch panel integrally formed with the display panel. In other words, the substrate to support at least one sensing electrode may be omitted.

In detail, at least one sensing electrode may be provided on at least one surface of the display panel 2000. The display panel 2000 may include the 1st' substrate 2100 and the 2nd' substrate 2200. That is, at least one sensing electrode may be disposed one surface of at least one of the 1st' substrate 2100 and the 2nd' substrate 2200.

Referring to FIG. 12, the first sensing electrode 310 may be provided on the top surface of the display panel 2000. In addition, a first wire connected with the first sensing electrode 310 may be provided. The second sensing electrode 320 and the substrate 100, on which the second wire is disposed, may be disposed on the display panel 200 on which the first sensing electrode 310 is disposed. The adhesive layer 700 may be disposed between the substrate 100 and the display panel 2000.

Although the drawings show the second sensing electrode 320 formed on the top surface of the first substrate 102 and the cover substrate 101 formed on the first substrate 102 while interposing the adhesive layer 700 therebetween, the embodiment is not limited thereto. For instance, the second sensing electrode 320 may be formed on a rear surface of the first substrate 102 and the cover substrate 101 may be omitted. In this case, the first substrate 102 may serve as the cover substrate.

The embodiments may not be limited to the drawings and it is enough if it is possible to provide the structure in which the first sensing electrode 310 is formed on the top surface of the display panel 2000, the first substrate 102 to support the second sensing electrode 320 is disposed on the display panel 2000 and the substrate 100 is combined with the display panel 2000.

In addition, the first substrate 102 may be a polarizing plate. That is, the second sensing electrode 320 may be provided on the top surface or the bottom surface of the polarizing plate. Thus, the second sensing electrode 320 may be integrally formed with the polarizing plate.

In addition, a polarizing plate separated from the first substrate 102 may be provided. In this case, the polarizing plate may be disposed under the first substrate 102. For instance, the polarizing plate may be disposed between the first substrate 102 and the display panel 2000. In addition, the polarizing plate may be disposed on the first substrate 102.

The polarizing plate may be a linear polarizing plate or an anti-reflection polarizing plate. For example, when the display panel 2000 is a liquid crystal panel, the polarizing plate may be a linear polarizing plate. In addition, when the display panel 2000 is an organic electroluminescent display panel, the polarizing plate may be an anti-reflection polarizing plate.

Figure 13:
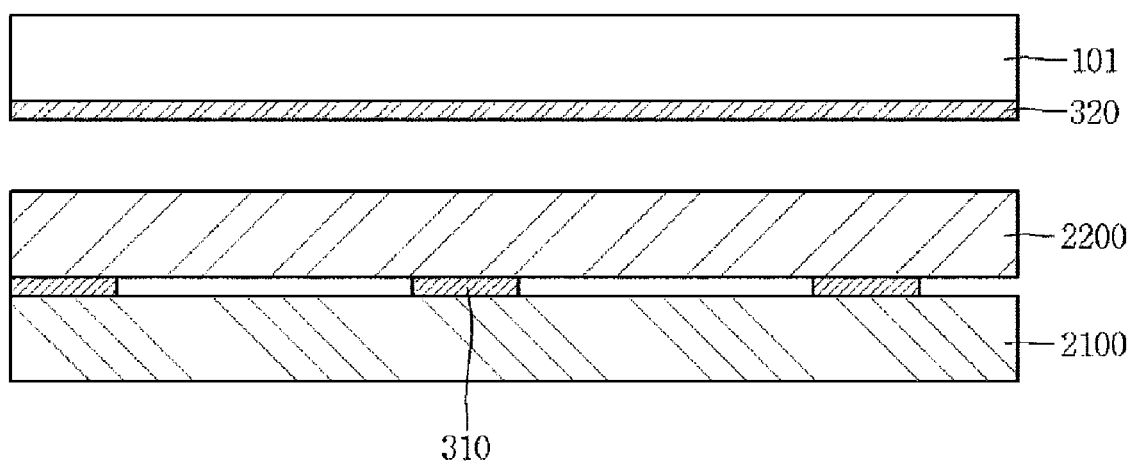

Referring to FIG. 13, the touch device according to another embodiment may include a touch panel formed integrally with the display panel. For example, a sensing electrode provided in the active area to serve as a sensor which senses a touch and a wire to apply an electrical signal to the sensing electrode may be formed inside the display panel. In detail, at least one sensing electrode or at least one wire may be formed inside the display panel.

The display panel may include the $1^{st}$ substrate 2100 and the $2^{nd}$ substrate 2200. In this case, at least one of the first and second sensing electrodes 310 and 320 may be interposed between the $1^{st}$ substrate 2100 and the $2^{nd}$ substrate

2200. In other words, at least one sensing electrode may be provided on at least one surface of the 1$^{st}$ substrate 2100 or the 2$^{nd}$ substrate 2200.

Referring to FIG. 13, the first sensing electrode 310 and the first wire may be provided between the 1$^{st}$ substrate 2100 and the 2$^{nd}$ substrate 2200. In addition, the second sensing electrode 320 and the second wire may be disposed on the substrate 100. The substrate 100 may be disposed on the display panel including the 1$^{st}$ substrate 2100 and the 2$^{nd}$ substrate 2200. In other words, the first sensing electrode 310 and the first wire may be provided inside the display panel and the second sensing electrode 320 and the second wire may be provided outside the display panel.

The first sensing electrode 310 and the first wire may be provided on the top surface of the 1$^{st}$ substrate 2100 or the rear surface of the 2$^{nd}$ substrate 2200. In addition, the adhesive layer may be disposed between the first substrate 102 and the display panel. In this case, the first substrate 102 may serve as the cover substrate.

Although the drawings show the configuration in which the second sensing electrode 320 is disposed on the rear surface of the first substrate 102, the embodiment is not limited thereto. The second sensing electrode 320 may be disposed on the top surface of the first substrate 102, and the cover substrate may be further disposed on the first substrate 102 while interposing the adhesive layer therebetween.

That is, the embodiments may not be limited to the drawings and it is enough if it is possible to provide the structure in which the first sensing electrode 310 and the first wire are disposed inside the display panel, and the second sensing electrode 320 and the second wire are disposed outside the display panel.

In addition, the first substrate 102 may be a polarizing plate. That is, the second sensing electrode 320 may be provided on the top surface or the bottom surface of the polarizing plate. Thus, the second sensing electrode 320 may be integrally formed with the polarizing plate.

In addition, a polarizing plate separated from the first substrate 102 may be provided. In this case, the polarizing plate may be disposed under the first substrate 102. For instance, the polarizing plate may be disposed between the first substrate 102 and the display panel 2000. In addition, the polarizing plate may be disposed on the first substrate 102.

When the display panel is a liquid crystal display panel, and when the sensing electrode is formed on the top surface of the 1$^{st}$ substrate 2100, the sensing electrode may be formed together with a thin film transistor (TFT) or a pixel electrode. In addition, when the sensing electrode is formed on the rear surface of the 2$^{nd}$ substrate 2200, a color filter layer may be formed on the sensing electrode or the sensing electrode may be formed on the color filter layer. When the display panel is an organic electroluminescent display panel, and when the sensing electrode is formed on the top surface of the 1$^{st}$ substrate 2100, the sensing electrode may be formed together with a thin film transistor or an organic light emitting device.

Figure 14:
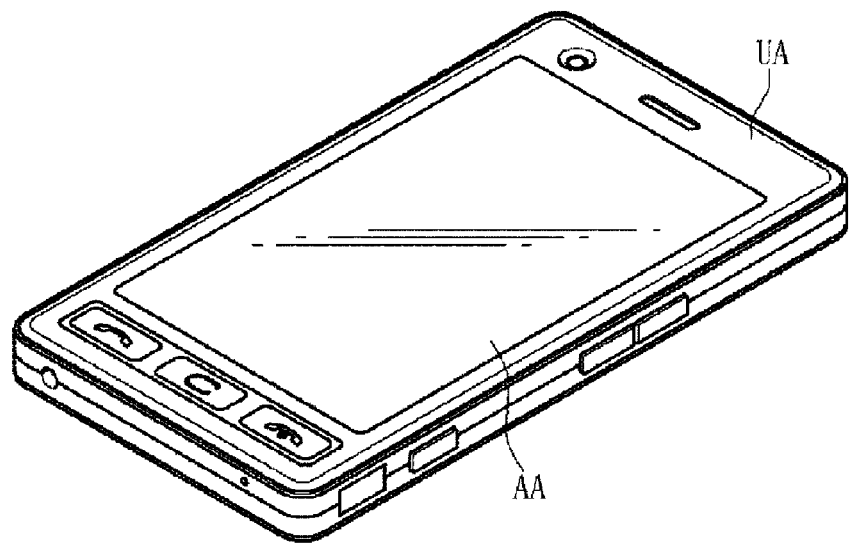
FIGS. 14 to 17 are views showing examples of touch devices employing a touch panel according to the embodiment.

One example of a touch device employing the touch panel according to the embodiment will be described with reference to FIGS. 14 to 17. Referring to FIG. 14, a mobile terminal is illustrated as an example of the touch device. The mobile terminal may include the active area AA and the unactive area UA. The active area AA is an area in which a touch signal is sensed due to the touch by a finger, and an instruction icon pattern part and a logo may be formed in the unactive area UA.

Figure 15:
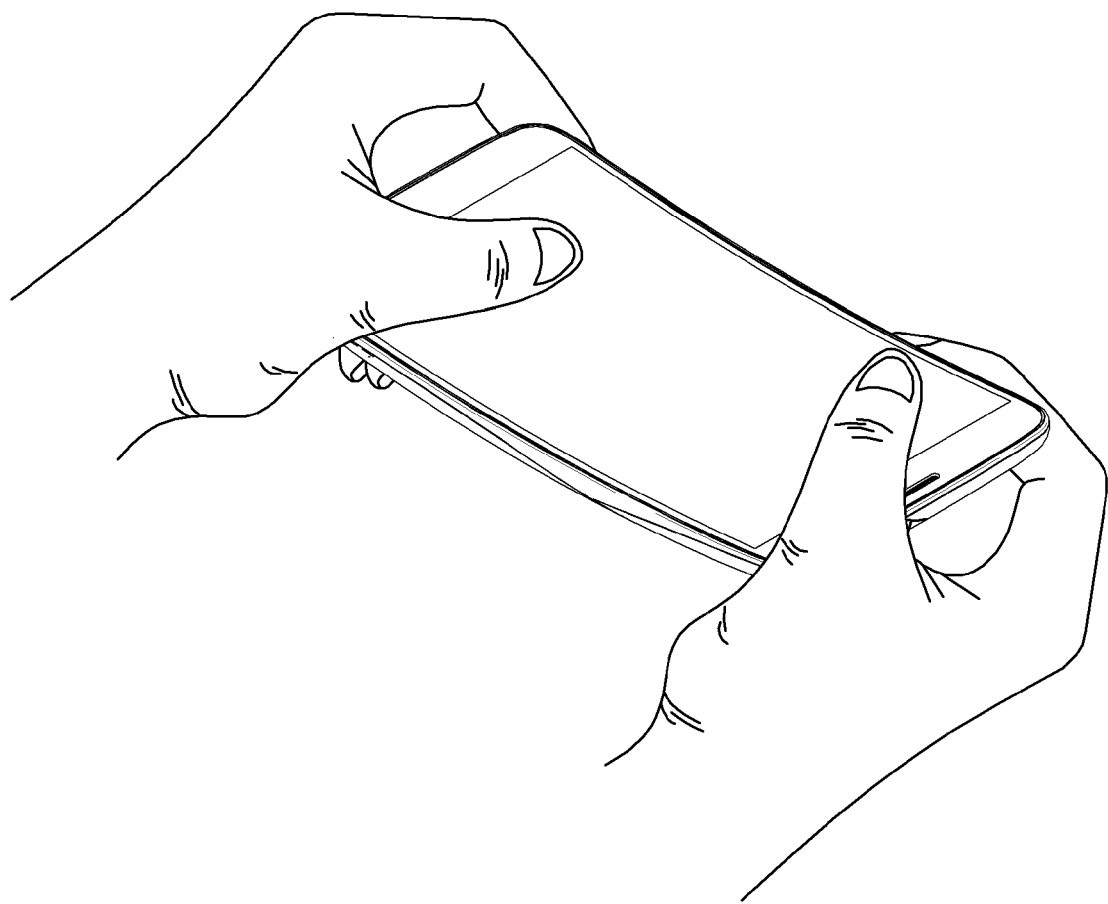

Referring to FIG. 15, the touch panel may include a flexible touch panel. Thus, the touch device including the touch panel may be a flexible touch device which may be bent or flex by a hand of a user. For example, the flexible touch panel may be applied to a wearable touch. The touch panel may be applied to glasses or watches put on the human body to implement the wearable touch.

Figure 16:
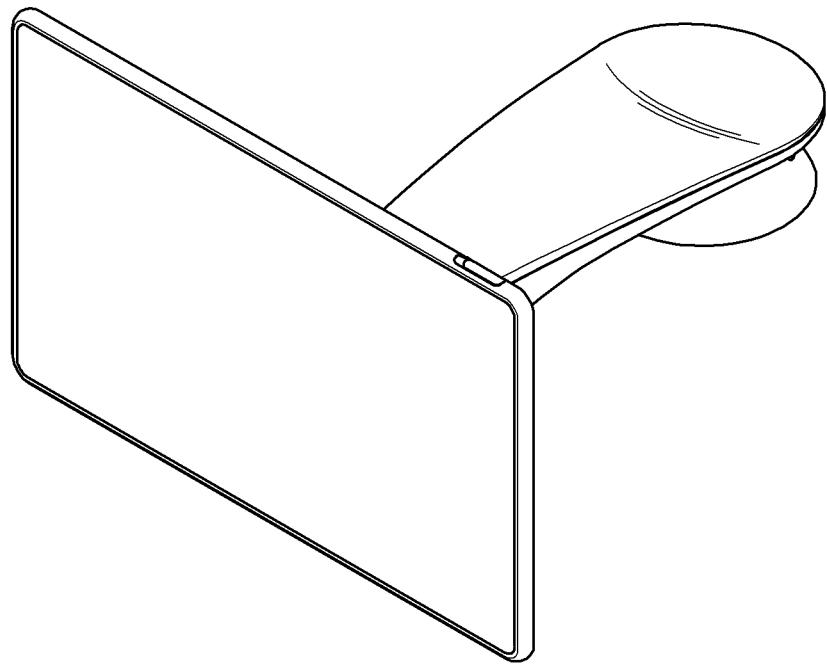
Figure 17:

Referring to FIG. 16, the touch panel may be applied to a vehicle navigation system as well as the touch device, such as the mobile terminal. Referring to FIG. 17, the touch panel may be applied inside a vehicle. In other words, the touch panel may be applied to various parts in the vehicle where the touch panel is applied. Accordingly, the touch panel is applied to a dashboard as well as a PND (Personal Navigation Display), thereby realizing a CID (Center Information Display). However, the embodiment is not limited thereto. In other words, the touch panel may be used in various electronic products.

The embodiment provides a touch panel capable of improving accuracy of touch and a touch device including the same.

According to the embodiment, there is provided a touch panel including a substrate; a sensing electrode on the substrate; wires to electrically connect the sensing electrode; a first ground electrode between the sensing electrode and the wire; and an overlap part where the first ground electrode overlaps with the sensing electrode.

According to another embodiment, there is provided a touch panel including a substrate on which an active area and an unactive area are defined; a sensing electrode on the active area; a wire disposed on the unactive area to electrically connect the sensing electrode; and a first ground electrode disposed on the active area between the sensing electrode and the wire.

The embodiment includes the first ground electrode. The first ground electrode can effectively prevent the coupling between the sensing electrode and the wire in each channel and can improve accuracy of touch. In addition, the uniform touch sensitivity can be achieved regardless of the touch positions. Thus, the non-uniform sensing, which signifies that the touch to an outer portion of a substrate is sensitively detected and the touch to the center portion of the substrate is insensitively detected, can be prevented. Accordingly, the hovering function can be accurately recognized and accuracy of the proximal touch and the glove touch can be improved.

In addition, the first ground electrode prevents static electricity or ESD in the touch panel. That is, the static electricity or ESD moves along a path of the first ground electrode, so that the static electricity or ESD can be prevented from being introduced into the touch panel. The first ground electrode is connected to the printed circuit board so that the ESD in the touch panel can be discharged as an electrical signal.

Thus, signal interference can be prevented, so that accuracy and reliability of a touch can be improved.

It will be understood that, when a layer (film), a region, a pattern or a structure is referred to as being "on" or "under" a substrate, another layer (film), region, pad or patterns, it can be "directly" or "indirectly" on the other layer (film), region, pattern or structure, or one or more intervening layers may also be present.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A capacitive touch sensor comprising;
   a substrate including an active area and an inactive area;
   a first sensing electrode, a second sensing electrode, and a connecting electrode provided on the active area;
   a wire provided on the inactive area; and
   a first bridge and a second bridge provided on the active area;
   wherein the first sensing electrode, second sensing electrode, and the connecting electrode are spaced apart,
   wherein the first sensing electrode extends in a first direction,
   wherein the second sensing electrode includes a plurality of second sensing electrode cells spaced apart from each other,
   wherein the first bridge and second bridge are spaced apart from each other,
   wherein the first bridge extends the second sensing electrode in a second direction by connecting the second sensing electrode cells to one another,
   wherein the connecting electrode is connected to the wire and arranged between the second sensing electrode and the wire
   wherein the connecting electrode extends toward the inactive area to connect to the wire at a first edge of the active area,
   wherein the second bridge connects the second sensing electrode with the connecting electrode, and
   wherein a width of the connecting electrode is less than a width of one of the second sensing electrode cells in the first and second directions.

2. The capacitive touch sensor of claim 1, wherein a length of the first bridge is longer than a length of the second bridge in the second direction.

3. The capacitive touch sensor of claim 1, wherein the first and second sensing electrodes are provided on the same surface of the substrate.

4. The capacitive touch sensor of claim 1, wherein the substrate includes a flat portion and a curved portion.

5. The capacitive touch sensor of claim 1, wherein at least one edge of the substrate is bent.

6. The capacitive touch sensor of claim 1, further comprising a cover substrate, wherein the cover substrate includes a flat portion and a curved portion.

7. The capacitive touch sensor of claim 1, wherein the first and second sensing electrodes and the second bridge are made of different materials.

8. The capacitive touch sensor of claim 1, further comprising a printing layer on the inactive area, wherein the printing layer prevents the wire from being viewed by a user.

9. The capacitive touch sensor of claim 1, wherein the first sensing electrode, the second sensing electrode, and the connecting electrode are provided on the same surface of the substrate.

10. The capacitive touch sensor of claim 9, wherein a length of the first bridge is longer than a length of the second bridge in the second direction.

11. The capacitive touch sensor of claim 9, wherein the first and second sensing electrodes are provided on the same surface of the substrate.

12. The capacitive touch sensor of claim 9, wherein the substrate includes a flat portion and a curved portion.

13. The capacitive touch sensor of claim 9, wherein at least one edge of the substrate is bent.

14. The capacitive touch sensor of claim 9, further comprising a cover substrate, wherein the cover substrate includes a flat portion and a curved portion.

15. The capacitive touch sensor of claim 9, wherein the first and second sensing electrodes and the second bridge are made of different material.

16. The capacitive touch sensor of claim 9, further comprising a printing layer on the inactive area, wherein the printing layer prevents the wire from being viewed by a user.

17. The capacitive touch sensor of claim 9, wherein the first sensing electrode, the second sensing electrode, and the connecting electrode are provided on the same surface of the substrate.

18. The capacitive touch sensor of claim 9, further comprising an insulating layer provided between the first sensing electrode and the first bridge.

19. The capacitive touch sensor of claim 1, further comprising an insulating layer provided between the first sensing electrode and the first bridge.

20. A capacitive touch sensor comprising;
    a substrate including an active area and an inactive area;
    a first sensing electrode, a second sensing electrode, and a connecting electrode provided on the active area;
    a wire provided on the inactive area; and
    a first bridge and a second bridge provided on the active area;
    wherein the first sensing electrode, second sensing electrode, and the connecting electrode are spaced apart,
    wherein the first sensing electrode extends in a first direction,
    wherein the second sensing electrode includes a plurality of second sensing electrode cells spaced apart from each other,
    wherein the first bridge and second bridge are spaced apart from each other,
    wherein the first bridge extends the second sensing electrode in a second direction by connecting the second sensing electrode cells to one another in series,
    wherein the connecting electrode is provided between the second sensing electrode and the wire at a first edge of the active area,
    wherein a first end of the connecting electrode is connected to the wire, and a second end of the connecting electrode is connected to the second bridge,
    wherein the second bridge connects the second sensing electrode with the connecting electrode, and
    wherein a width of the connecting electrode is less than a width of one of the second sensing electrode cells in the first and second directions.

21. A touch device comprising;
a first substrate;
a thin film transistor provided on the first substrate;
an organic light emitting device provided on the thin film transistor;
an encapsulation layer provided on the organic light emitting device;
a substrate provided on the encapsulation layer and including an active area and an inactive area;
a first sensing electrode, a second sensing electrode, and a connecting electrode provided on the active area,
a wire provided on the inactive area; and
a first bridge and a second bridge provided on the active area;
wherein the first sensing electrode, second sensing electrode, and the connecting electrode are spaced apart,
wherein the first sensing electrode extends in a first direction,
wherein the second sensing electrode includes a plurality of second sensing electrode cells spaced apart from each other,
wherein the first bridge and second bridge are spaced apart from each other,
wherein the first bridge extends the second sensing electrode in a second direction by connecting the second sensing electrode cells to one another,
wherein the connecting electrode is connected to the wire and arranged between the second sensing electrode and the wire,
wherein the connecting electrode extends toward the inactive area to connect to the wire at a first edge of the active area,
wherein the second bridge connects the second sensing electrode with the connecting electrode, and
wherein a width of the connecting electrode is less than a width of one of the second sensing electrode cells in the first and second directions.

22. The touch device of claim 21, wherein a length of the first bridge is longer than a length of the second bridge in the second direction.

23. The touch device of claim 21, wherein the first and second sensing electrodes are provided on the same surface of the substrate.

24. The touch device of claim 21, wherein the substrate includes a flat portion and a curved portion.

\* \* \* \* \*